Patented July 3, 1934

1,964,808

UNITED STATES PATENT OFFICE 1,964,808

PROCESS OF SEPARATING ACIDIC GASES

Robert Roger Bottoms, Louisville, Ky., assignor to The Girdler Corporation, Louisville, Ky., a corporation of Delaware No Drawing. Application December 30, 1932, Serial No. 649,601

6 Claims. (Cl. 23—2)

This invention relates to the separation of acidic gases from other gases or gaseous mixtures, by means of an absorbing agent. By the term "acidic gases" I means those gases which in water solution have an acid reaction, but which are released unchanged upon sufficient heating of the water. Carbon dioxide and hydrogen sulphide are the main gases of this type which are present in the gaseous mixtures commonly encountered in industrial operations.

The process may be employed for the separation and recovery of these acidic gases from the mixture, or may be employed to purify other gases by removal of said acidic gases therefrom.

The main objects of my invention are to facilitate the separation, effect complete or more nearly complete removal or recovery of said acidic gases, facilitate the regeneration of the absorbent agent, and to increase the rate of such regeneration. To secure these objects I employ an absorbent agent which, in comparison with the usual alkaline carbonates, such as sodium carbonate, has greater solubility and greater absorption capacity per unit of volume, whereby a smaller amount of the absorbent is needed and smaller and cheaper apparatus required for the treatment of a given volume of gas. I employ an absorbent agent which produces products with the acidic gases which are highly soluble and readily decomposed upon heating to liberate the gas.

In my prior reissue Patent 18,958 and Patent 1,834,016, I have disclosed and claimed the use of certain amines which may be used for this purpose with satisfactory results. I have now discovered that certain soluble borates may be employed effectively for the separation of acidic gases. I am aware that it has been proposed to use borax (sodium tetraborate) in connection with the removal of hydrogen sulphide and the production of free sulphur, but due to the low solubility of borax (about 3.9 grams per 100 grams of water), and its low hydrogen ion concentration or pH. value (about 9½), it is of little if any more value for the removal of acidic gases than are sodium carbonate or other such alkali salts. Only about 40 to 60 grains of hydrogen sulphide can be removed per gallon of solution by the use of borax. The class of borates which I employ are characterized by their far greater solubility, their higher hydrogen ion concentration, and their capacity for removing far greater quantities of the acidic gas per gallon of solution employed.

The compounds which I employ may be certain of the soluble borates of the alkalies or of the amines. These alkali borates may be used in a water solution, in connection with the various amines disclosed and claimed in my prior patents above referred to, as well as certain other and more volatile amines.

The apparatus which may be employed and the general method of circulating the solution through the reabsorption and reactivation stages of the cycle, and the temperature changing or controlling means, may be substantially the same as is described in said prior patents. The solution is passed downwardly through a column in countercurrent to the gaseous mixture containing the acidic gases to be removed, and the solution containing these gases is then caused to flow down through a reactivator in which the solution is heated, and the gases are caused to be driven off. The freed solution from the reactivator is cooled and returned to the top of the absorber.

Potassium metaborate is very readily soluble in water, about 71 grams being soluble in 100 grams of water, and such a solution will act to remove 500 to 2000 grains of hydrogen sulphide per gallon of solution, depending upon the concentration of the hydrogen sulphide in the gas treated. By reason of the high solubility, smaller equipment is needed than where potassium carbonate is used, and the smaller volume of solution may be circulated for treating a given volume of gas.

Other potassium as well as sodium borates may be used, but in order to obtain commercially satisfactory results only those borates should be used which have a solubility in excess of 5 grams of the anhydrous salt per 100 grams of water at 30° C. Although potassium tetraborate is not as satisfactory as potassium metaborate, it may be used in some cases as it has a solubility of about 19.3 grams per 100 grams of water. The metaborates permit the circulation of a more concentrated solution, and result in a greater removal of hydrogen sulphide, carbon dioxide, or other acidic gases per gallon of solution.

The use of soluble borates in connection with amines or as amine borates has certain important advantages. For instance amines readily volatile at the reactivation temperature, that is about 100° C., such as ethylamine, cannot be used in the process of my prior Patent 1,783,901, without adding expensive rectifiers and reflux condensers; but more volatile amines may be used as borates, such for instance as ethylamine borate, in an entirely satisfactory manner. Thus the use of borates makes possible the commercial use of more volatile amines.

With certain amines used alone or in water solution for the removal of carbon dioxide, the carbon dioxide attacks the steel and causes corrosion in the equipment, which causes deterioration of the equipment unless more expensive corrosion resistant materials be employed. I have discovered that the use of these amines in the form of borates prevents such corrosion of steel and thus permits the building of less expensive equipment and increased life of the equipment.

Furthermore, I have discovered that an amine borate absorbs carbon dioxide and other acidic gases with less generation of heat than is the case with the amine alone, and the reactivation requires the expenditure of less heat.

The reaction which takes place during absorption and reactivation is similar to that where the alkali borate is used, and may be represented by the folowing formulæ:

Absorption 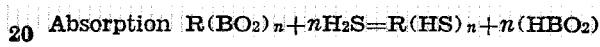
$$R(BO_2)_n + nH_2S = R(HS)_n + n(HBO_2)$$

Reactivation
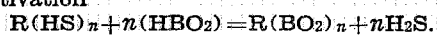
$$R(HS)_n + n(HBO_2) = R(BO_2)_n + nH_2S.$$

In this general formula "R" may represent amines which may be either primary, secondary or tertiary, depending upon the number of hydrogen atoms of the ammonia which have been replaced by carbon-containing groups, and may be either mono, di or tri amines, depending upon the number of amino groups involved. In the formula "R" represents any of these amines, such as monoethanolamine, diethanolamine, triethanolamine, ethylene diamine, diaminopropanol, piperidine, nicotine, or hydroquinoline.

The amine borate need not be a metaborate, as it may be any of the series of borates, for instance the tetraborates, in which the formula would be:

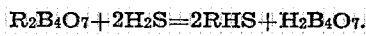
$$R_2B_4O_7 + 2H_2S = 2RHS + H_2B_4O_7.$$

As previously noted, I may use borates of amines boiling under 100° C., for instance the ethylene diamine borate or the diethylamine borate. I may prepare the desired borate and put it in the apparatus, or I may put in the apparatus ingredients which will react to form the desired borate. For instance, if potassium metaborate is desired, I may separately add the boric acid and potassium hydroxide in the proper proportions. When using ethylene diamine borate I may add the ingredients in the proportions of 1 mol of ethylene diamine to 2 mols of boric acid ($H_3BO_3$).

Although in practice I ordinarily prefer to heat the solution containing the absorbed gas so as to separate the acidic gas as such and restore the absorbent to its original condition, I may in the case of hydrogen sulphide effect reactivation by oxidation instead of by heating, in which case the absorbent is restored to its original form and free sulphur is liberated and may be filtered out instead of the hydrogen sulphide being driven off as a gas.

Having thus described my invention, what I claim as new and desire to secure by Letters Patent is:

1. The process of separating an acidic gas from a gaseous mixture, by effecting intimate contact of the gaseous mixture with a solution of an amine in which the amine is in the form of an amine borate whereby corrosion of the apparatus is substantially prevented, and thereafter treating said solution to separate therefrom the absorbed gases.

2. The process of separating an acidic gas from a gaseous mixture and preventing corrosion of the apparatus employed, which includes effecting intimate contact of the gaseous mixture with a solution of a borate of an amine volatile at 100° C., and thereafter treating said solution to separate therefrom the absorbed gases.

3. The process of separating an acidic gas from a gaseous mixture, which includes effecting intimate contact of the gaseous mixture with a solution of an ethanolamine borate, and thereafter treating said solution to separate therefrom the absorbed gases.

4. The process of separating an acidic gas from a gaseous mixture, which includes effecting intimate contact of the gaseous mixture with a solution of a diaminopropanol borate, and thereafter treating said solution to separate therefrom the absorbed gases.

5. The process of separating an acidic gas from a gaseous mixture, which includes effecting intimate contact of the gaseous mixture with a solution of an amine borate, and thereafter heating said solution to separate therefrom the absorbed gases.

6. In a process of separating an acidic gas from gaseous mixtures by effecting intimate contact of the gaseous mixture with an amine in water solution, the addition of a borate to the amine solution to prevent corrosion of the apparatus by the reaction products of the gas and said amine.

ROBERT ROGER BOTTOMS.